March 16, 1954  E. H. SMITH  2,672,186
AUTOMATIC GAS BURNING TORCH AND PILOT LIGHT
Filed Sept. 14, 1949  2 Sheets-Sheet 1
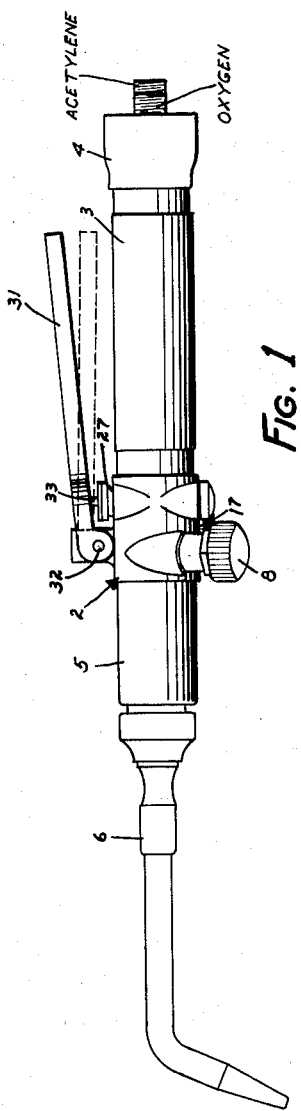
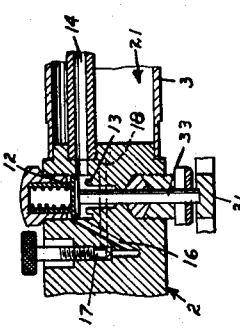
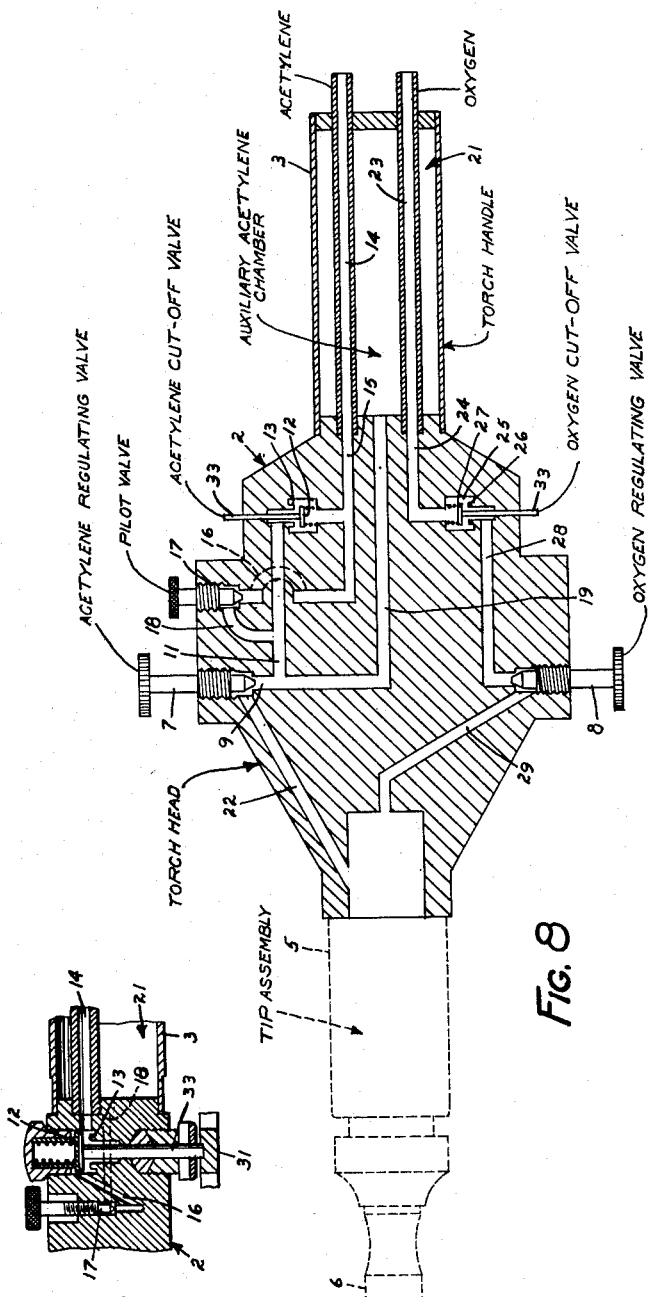
INVENTOR.
ELMER H. SMITH
BY
ATTORNEYS

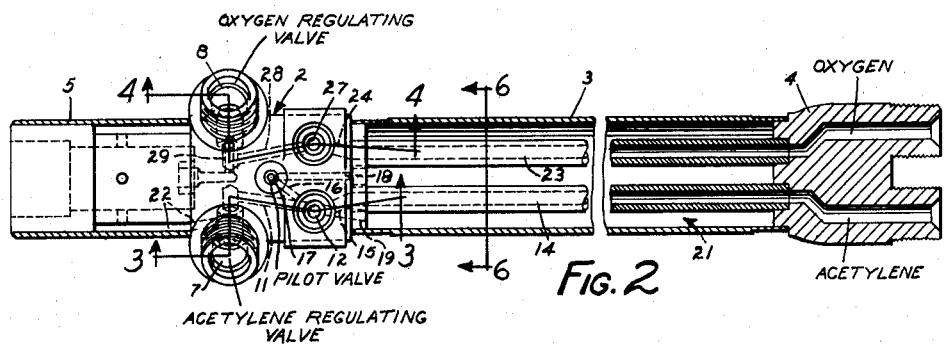
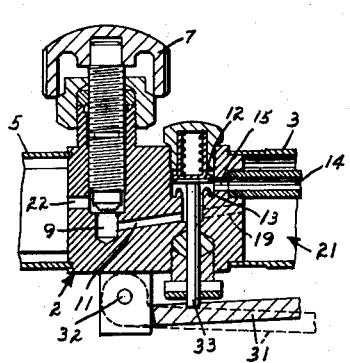
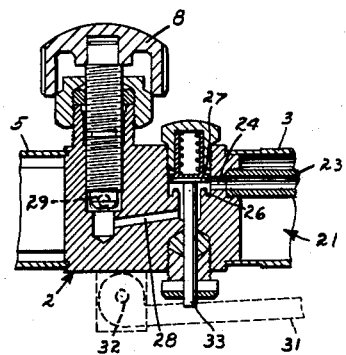
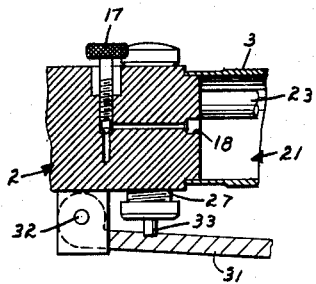
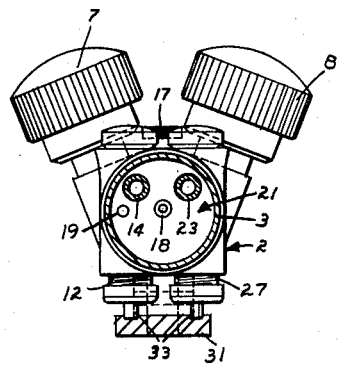

ated Mar. 16, 1954

2,672,186

UNITED STATES PATENT OFFICE 2,672,186

AUTOMATIC GAS BURNING TORCH AND PILOT LIGHT

Elmer H. Smith, Minneapolis, Minn., assignor to Smith Welding Equipment Corporation, Minneapolis, Minn., a corporation of Minnesota Application September 14, 1949, Serial No. 115,710

3 Claims. (Cl. 158—27.4)

This invention relates to new and useful improvements in oxy-acetylene torches, generally, and more particularly to such devices commonly known to the trade as "automatic" torches.

"Automatic" torches now commonly used in the trade, usually comprise a pair of needle valves for regulating the supplies of acetylene and oxygen to the torch tip, and a pair of cut-off valves arranged to be simultaneously opened by a single operating lever mounted on the torch body, whereby it may be conveniently manipulated by the operator or mechanic grasping the usual handle of the torch. Such torches are also provided with a pilot valve for controlling a low flow of acetylene or other fuel gas to maintain a pilot flame at the end of the torch tip. The pilot flame re-ignites the welding flame when the operator wishes to resume welding after having put the torch aside to perform non-welding duties.

One objection to present day "automatic" torches resides in the fact that they are so constructed that in many instances, when the operator momentarily releases his grip on the operating lever to temporarily interrupt the operation of the torch by suddenly cutting off the flow of oxygen and acetylene to the torch tip, the sudden interruption of the flow of gases to the tip often causes the pliot flame to go out or become extinguished because when the supplies of acetylene and oxygen to the tip are thus suddenly cut off, a slight vacuum may tend to develop at the tip of the torch and thereby momentarily cause a deficiency in the supply of gas to the pilot flame, causing the pilot flame to fail to function. When the pilot flame thus momentarily completely fails, it becomes necessary for the operator to re-ignite the pilot before the torch can again be made to function as contemplated in its design.

An important object of the present invention therefore is to provide an "automatic" torch which is so constructed that the pilot flame is not likely to go out, when the operator momentarily puts the torch aside.

A further object resides in the provision of an "automatic" torch of the class described, comprising means for automatically maintaining an adequate flow of acetylene to the pilot flame when the cut-off valves are closed, whereby the pilot flame will continue to function uninterruptedly, even though the cutting flame may be frequently interrupted by the operator.

A further object is to provide a torch of the character herein disclosed comprising an auxiliary acetylene supply chamber which is in direct communication with the supply of acetylene to the torch tip, during normal operation of the torch, whereby when the operator momentarily releases the operating lever and permits the cut-off valves suddenly to cut off the supplies of acetylene and oxygen to the torch tip, the flow of acetylene to the pilot flame will continue for a brief period, under line pressure, until the pressure of the acetylene in the auxiliary chamber drops to approximately atmospheric pressure, after which the pilot flame will continue to burn in its normal manner.

A further object of the invention is to provide a torch comprising a handle having a head at one end provided with a socket for interchangeably receiving a welding tip assembly or a cutting tip assembly, depending upon the character of the work to be performed, and the torch head being provided with the usual acetylene and oxygen regulating valves, the usual cut-off valves, and a pilot valve, and means being embodied in the torch for maintaining an adequate flow of fuel gas to the preheating orifice at the torch to assure continued operation of the pilot flame, when the supplies of oxygen and acetylene to the tip are instantly cut off, whereby the operator may be assured the pilot flame will not become extinguished, when the torch is momentarily placed on a work bench or other support, to allow the mechanic to perform non-welding operations, often necessary in the performance of a certain job, and whereby the torch may be operated intermittently without requiring the oxygen and acetylene regulating valves to be readjusted following each welding operation.

Other objects of the invention reside in the novel construction of the torch handle whereby it also provides an auxiliary chamber for momentarily maintaining an adequate flow of acetylene to the pilot flame to assure that it will continue to function, each time the supplies of oxygen and acetylene to the tip are cut off; and in the simple and inexpensive construction of the means providing the auxiliary chamber for maintaining an adequate flow of acetylene to the pilot flame to assure continued operation thereof, when the cut-off valves are closed to suddenly interrupt the flow of gases to the torch tip.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevation of an "automatic" torch with the invention embodied therein;

Figure 2 is a bottom view of the torch handle and head shown in Figure 1, with the valves detached from the torch head and showing the handle in section to illustrate the arrangement of the oxygen and acetylene conduits therein;

Figure 3 is a fragmentary detail sectional view substantially on the line 3—3 of Figure 2, showing the acetylene regulating valve and its cut-off valve in open positions, as when the torch is in operation;

Figure 4 is a similar view on the line 4—4 of Figure 2, showing the oxygen regulating valve and its cut-off valve in open positions;

Figure 5 is a fragmentary detail sectional view of a portion of the torch head, showing the valve for regulating the pilot flame;

Figure 6 is a cross sectional view on the line 6—6 of Figure 2, showing the relationship between the oxygen and acetylene control valves, and the cut-off valves associated therewith;

Figure 7 is a fragmentary detail sectional view showing the by-pass between the pilot valve and the cut-off valve for interrupting the flow of acetylene gas to the tip; and Figure 8 is a diagrammatic view showing the torch head in section and the various conduits provided therein and the arrangement of all of the valves which cooperate to control the flow of acetylene and oxygen to the tip in the operation of the torch, and also illustrating the auxiliary chamber and its connection with the acetylene supply passage whereby the acetylene in said auxiliary chamber is maintained at line pressure.

In the selected embodiment of the invention herein disclosed, there is illustrated in Figure 1, for purposes of disclosure, a conventional "automatic" welding torch comprising the usual torch head 2 having one end of a handle 3 secured thereto, the opposite end of which is shown connected to the usual butt member 4 of the torch, as is well known in the art. The head is shown provided with a tubular extension 5 bored to receive a conventional tip assembly, indicated by the numeral 6, which may be either a welding assembly or a cutting assembly.

The usual acetylene and oxygen control valves 7 and 8, respectively, are provided in the head 2 for controlling the supplies of acetylene and oxygen to the tip assembly. The acetylene and oxygen valves are of the usual needle type, and the acetylene valve 7 is shown having its needle arranged to control the flow of acetylene from the upper end of a passage 9, when viewed as shown in the diagrammatic illustration in Figure 8.

The passage 9 is in direct communication with one end of a branch line 11 having its opposite end in communication with a cut-off valve 12 on the discharge side of its valve seat 13. The valve 12 is normally retained in closed position by a suitable spring, thereby to interrupt the flow of acetylene gas to the regulating valve 7, as will be understood by reference to Figure 8.

Acetylene is supplied from a suitable source, as is well known in the art, and passes through a conduit 14 which extends through the handle 3 and has its opposite end secured to the head 2 in communication with one end of a duct 15, which also is in direct communication with the valve chamber of the cut-off valve 12.

The opposite end of the duct 15 is in communication with one end of a by-pass 16, the opposite end of which is in communication with a pilot valve 17 for controlling the flow of acetylene gas to the pilot flame, during periods when the torch is not being used for welding or cutting. It will also be noted that the pilot valve is always in communication with the duct 15 through the by-pass 16. Thus, whether the acetylene cut-off valve 12 is open or closed, the pilot valve 17 is always in condition to receive a supply of acetylene gas. A short duct 18 connects the pilot valve with the passage 11 whereby when the pilot valve is open, acetylene gas is constantly supplied to the acetylene regulating valve 7 to supply the usual pilot flame at the tip of the torch.

An important feature of the present invention resides in the provision of means for making certain that the pilot flame will function at all times during periods when the torch is momentarily put aside to allow the operator or mechanic to perform non-welding or non-cutting operations, frequently necessary in the operation of a given welding job. The means provided for thus preventing the pilot flame from becoming extinguished, when the cut-off valve 12 is suddenly closed to interrupt the flow of acetylene to the torch tip, is shown comprising an auxiliary acetylene supply passage 19, located in the torch head and having one end in communication with the interior of the tubular member which constitutes the handle 3 of the torch. The opposite end of passage 19 is in communication with the passage 9 leading to the acetylene control valve 7.

The interior of the handle 3 is sealed to the atmosphere and provides an auxiliary chamber 21 for containing a supply of acetylene under line pressure, during the operation of the torch. This will readily be understood by reference to Figure 8, wherein it will be noted that the chamber 21 is in direct communication with the acetylene regulating valve 7. When the valve 7 is open, acetylene may flow from said valve through a passage 22 to the tip assembly in the usual manner each time the cut-off valve 12 is opened.

The oxygen required to provide the proper fuel mixture is obtained from a suitable source of supply in the usual manner, and passes through a conduit 23 located within the handle 3, and having one end fixed in the head 2 and in communication with one end of a duct 24. The opposite end of the duct 24 is in direct communication with a valve chamber 25 having a valve seat 26 normally engaged by a cut-off valve 27, by a suitable spring shown in Figure 8. A passage 28 leads from the valve chamber 25 to the oxygen regulating valve 8, which in turn is in communication with a duct 29 for conducting oxygen from the regulating valve 8 to the tip assembly, as is well known.

An operating lever 31, best shown in Figure 1, is mounted for pivotal movement upon the torch body by a suitable pivot 32, and is provided with lateral extensions adapted to engage the stems 33 of the cut-off valves 12 and 27, as will be understood by reference to Figure 1. Thus, each time the operating lever 31 is depressed to the dotted line position shown in Figure 1, the cut-off valves are opened to permit free flow of acetylene and oxygen to the torch tip, such flow being regulated to produce the desired flame by manipulation of the regulating valves 7 and 8. The springs which normally maintain the cut-off valves 12 and 27 in closed positions may have sufficient tension to maintain the operating lever 31 in its normal valve-closing position, as when the torch is not in use.

In the operation of the novel torch herein disclosed, the operator or mechanic adjusts the gas regulating valves 7 and 8 until he obtains the desired type of flame for the job at hand. During the operation of so adjusting the torch flame, the operator depresses the operating lever 31 so that gas may freely flow through the gas regulating valves 7 and 8 to the tip, whereby the operation of regulating the flame may be carried on in the usual manner. As soon as the desired flame is obtained, the operator may release his grip on the handle 31 whereby the supplies of acetylene and oxygen to the tip are cut off, as will be understood by reference to Figures 1 and 8.

The auxiliary chamber 21, however, will be in direct communication with the supply of acetylene so long as the acetylene cut-off valve is open, because of the passage 19 thereof being connected to the passage 11, which is in communication with the acetylene cut-off valve duct 15, as clearly illustrated in Figure 8. When the torch is temporarily put aside, the welding flame, of course, ceases to function because of the interruption in the flow of oxygen and acetylene to the torch tip, when the operator releases the operating lever 31, but the pilot flame continues to burn during such inoperative period of the torch because of the acetylene regulating valve 7 being open, as shown.

When the operator initially depresses the operating lever 31 to start the torch, acetylene and oxygen will flow under pressure to the tip in the correct quantities, and when the mechanic completes the welding operation, and releases his grip on the torch handle, the operating lever 31 immediately moves into its closed position, whereby the cut-off valves 12 and 27 instantly cut off the supplies of acetylene and oxygen to the tip and thereby extinguish the welding flame. The pilot flame however, must continue to function so as to ignite the cutting flame, when the torch is again to be used.

The invention herein disclosed assures uninterrupted operation of the pilot flame during such periods of non-use of the welding flame. This results because of the tip of the torch being in constant communication with the auxiliary chamber 21 when the torch is in use. Thus, when the operator completes a welding operation, and decides to momentarily lay the torch aside to enable him to do a non-welding operation, the cut-off valves 12 and 27 temporarily close, to interrupt the flow of oxygen and acetylene therethrough. Acetylene, however, will continue momentarily to flow to the pilot light, at line pressure, from the chamber 21, to maintain a pilot flame of normal operating size, until the pressure in the auxiliary chamber diminishes, as said chamber exhausts its supply of acetylene. By thus initially maintaining a full flow of acetylene, to the pilot flame when the cut off valves are closed, the torch may be quickly passed from its position of use to a position of repose on a work bench or other support, as the pilot flame is not likely to be blown out when quickly passing the torch from one position to another. When the pressure of the acetylene in the auxiliary chamber 21 has been completely spent, the supply of acetylene to the pilot flame will be from the supply conduit 14, through the pilot valve 17, and open needle valve 7, as may be clearly noted by reference to Figure 8.

The invention is applicable for use in connection with either welding or cutting tip assemblies. The provision of the auxiliary chamber and its connection with the tip of the torch positively eliminates all danger of the pilot flame becoming extinguished when the supplies of acetylene and oxygen are suddenly interrupted by closing of the cut-off valves 12 and 27, because the pressure of the gas in the auxiliary chamber 21 is unaffected by the actions of the cut-off valves, and assures a constant flow of fuel gas from the tip to feed the pilot flame from the instant the supplies of welding or cutting gases are cut off at the termination of a welding operation, until the torch is again picked up by the operator to resume the welding operation.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A torch comprising a tubular handle having a head secured to one end thereof, conduits in said handle having means for connecting them to supplies of oxygen and acetylene under pressure, means in said head for receiving a tip assembly, said head having oxygen and acetylene passages therein in communication with the conduits in the handle and the means for securing a tip assembly, valve means in the torch head and in said oxygen and acetylene passages therein for regulating the flows of oxygen and acetylene to the means for securing a torch tip assembly to provide a working flame, quick acting gas cut-off valves in said head positioned in the oxygen and acetylene gas passages therein to interrupt gas flow from said supply conduits to the means for securing a torch tip assembly and adapted when open to permit free flow of oxygen and acetylene to the means for securing a torch tip assembly to support a working flame, an acetylene by-pass conduit in said head connected to said acetylene passage to by-pass said acetylene quick acting cut-off valve, a pilot flame control valve in said by-pass conduit, means comprising an auxiliary acetylene supply chamber, and a passage connecting said chamber to the acetylene passage in said head at a point on the downstream side of the acetylene cut-off valve between said by-pass conduit with its associated pilot flame control valve and said means in the head for securing a torch tip assembly, whereby when the torch is in operation acetylene under pressure will enter said chamber, so that when the quick acting cut-off valves are subsequently manipulated to interrupt the working flame, the acetylene in said chamber will momentarily flow therefrom to the acetylene gas passage in the head and to the means for securing a torch tip assembly to maintain a pilot flame and assure continued operation thereof.

2. A torch comprising a tubular handle having a head secured to one end thereof, conduits in said handle having means for connecting them to supplies of oxygen and acetylene under pressure, means in said head for receiving a tip assembly, said head having oxygen and acetylene passages therein in communication with the conduits in the handle and the means for securing a tip assembly, valve means in the torch head and in said oxygen and acetylene passages therein for regulating the flows of oxygen and acetylene to the means for securing a torch tip assembly to provide a working flame, quick acting gas cut-off valves in said head positioned in the oxygen and acetylene gas passages therein to interrupt gas flow from said supply conduits to the means for securing a torch tip assembly and adapted when open to permit free flow of oxygen and acetylene to the means for securing a torch tip assembly to support a working flame, an acetylene by-pass conduit in said head connected to said acetylene passage to by-pass said acetylene quick acting cut-off valve, a pilot flame control valve in said by-pass conduit, said handle including means comprising an auxiliary acetylene supply chamber therein, and a passage in said head connecting said chamber to the acetylene passage in said head at a point on the downstream side of the acetylene cut-off valve between said by-pass conduit with its associated pilot flame control valve and said means in the head for securing a torch tip assembly, whereby when the torch is in operation acetylene under pressure will enter said chamber, so that when the quick acting cut-off valves are subsequently manipulated to interrupt the working flame, the acetylene in said chamber will momentarily flow therefrom to the acetylene gas passage in the head and to the means for securing a torch tip assembly to maintain a pilot flame and assure continued operation thereof.

3. A torch comprising a tubular leaktight handle having a head secured to one end thereof, said head having oxygen and acetylene passages therein, conduits extending through said handle and having means for connecting them to supplies of oxygen and acetylene under pressure, means in the head for receiving a tip assembly, regulating valves in the torch head and in said oxygen and acetylene passages therein for regulating the flows of oxygen and acetylene through said oxygen and acetylene passages to the means for securing a tip assembly and whereby a working flame may be varied to suit conditions, a pair of normally closed quick-acting cut-off valves interposed in the gas passages in the torch head between said conduits in said handle and said regulating valves, a single operating lever for said cut-off valves positioned to be actuated by an operator grasping the torch handle, thereby to open the quick acting cut-off valves and permit free flow of oxygen and acetylene to the means in the head for receiving a tip assembly, an acetylene by-pass conduit in said head connected to said acetylene passage therein to by-pass said acetylene quick acting cut-off valve, a pilot flame control valve in said by-pass conduit, said tubular leak-tight handle including means therein comprising an auxiliary acetylene chamber, and a passage in said head connecting said chamber to the acetylene passage in said head at a point on the downstream side of the acetylene cut-off valve between said by-pass conduit with its associate pilot flame control valve and said means in the head for securing a torch tip assembly, whereby acetylene under pressure enters said chamber during operation of the torch, the acetylene in said chamber momentarily maintaining a flow of acetylene to the acetylene supply passage in the head and the means in the head for securing a tip assembly, after interruption of the working flame by closure of said quick acting cut-off valves, thereby to assure continued operation of a pilot flame.

ELMER H. SMITH.

References Cited in the file of this patent

UNITED STATES PATENTS

| Number | Name | Date |
|---|---|---|
| 1,121,218 | Wiss | Dec. 15, 1914 |
| 2,372,305 | Walker | Mar. 27, 1945 |
| 2,388,327 | Jacobsson et al. | Nov. 6, 1945 |
| 2,444,490 | Bellinger | July 6, 1948 |

FOREIGN PATENTS

| Number | Country | Date |
|---|---|---|
| 205,491 | Germany | Jan. 2, 1909 |
| 602,895 | Germany | Sept. 19, 1934 |